United States Patent
Huang et al.

[11] Patent Number: 6,153,131
[45] Date of Patent: Nov. 28, 2000

[54] METHOD FOR DESIGNING AN EXTRUSION PROCESS AND DIE

[76] Inventors: Yean-Jenq Huang, 15605 Carmenita Rd., Suite 110, Sante Fe Springs, Calif. 90670; Yen-Chieh Huang; Shu-Hua Chang, both of #2 Lane 54, Ho-pin St., Young-Ho City, Taipei, Taiwan

[21] Appl. No.: 09/468,509

[22] Filed: Dec. 21, 1999

Related U.S. Application Data

[63] Continuation-in-part of application No. 08/961,462, Oct. 30, 1997, Pat. No. 6,004,489, which is a continuation-in-part of application No. 08/647,579, May 13, 1996, Pat. No. 5,756,016.

[51] Int. Cl.$^7$ .................................................. B29C 47/92
[52] U.S. Cl. ........................ 264/40.1; 72/271; 264/176.1; 364/475.01; 425/461
[58] Field of Search ................................ 264/40.1, 176.1, 264/40.5, 40.7, 177.11, 219; 425/461; 72/269, 271, 467; 76/107.4, 107.6, 107.1; 364/468.03, 475.01

[56] References Cited

U.S. PATENT DOCUMENTS

| | | | |
|---|---|---|---|
| 4,736,656 | 4/1988 | Futamura | 76/107 |
| 5,095,734 | 3/1992 | Asher | 72/467 |
| 5,490,408 | 2/1996 | Ando et al. | 72/256 |
| 5,756,016 | 5/1998 | Huang et al. | 264/40.1 |
| 5,974,850 | 11/1999 | Huang et al. | 72/271 |
| 6,004,489 | 12/1999 | Huang et al. | 264/40.1 |

FOREIGN PATENT DOCUMENTS

| | | |
|---|---|---|
| 906 925 | 3/1954 | Germany . |
| 3414994 | 4/1984 | Germany . |
| 06254619 | 9/1994 | Japan . |

*Primary Examiner*—Mathieu D. Vargot
*Attorney, Agent, or Firm*—Sand & Sebolt

[57] ABSTRACT

A method for designing an extrusion process and extrusion die includes the steps of first determining the optimal extrusion process parameters and then designing an extrusion die based on those optimal parameters. The optimal extrusion process parameters are determined by identifying the geometric characteristics of the selected extrusion profile, determining the physical characteristics of the material to be extruded, determining the physical characteristics for the extrusion processor, and detrmining the extrusion process limitation chart for the selected extrusion profile, selected extrusion material, and the selected extrusion processor. After the extrusion process limitation chart has been determined, a preferred extrusion process window is determined for the extrusion process limitation chart. A series of simulations are then run to determine if the selected temperatures and speeds result in an entire extrusion process falling within the extrusion process window. If the selected criteria result in a process that extends beyond the window, new selections are made and the simulation is repeated until the process falls entirely within the extrusion process window. The criteria are then used in a feed forward set up to run the extrusion process.

14 Claims, 10 Drawing Sheets

METHOD FOR DESIGNING AN EXTRUSION PROCESS AND DIE

CROSS REFERENCE TO RELATED APPLICATIONS

This application is a continuation-in-part application claiming priority from Ser. No 08/961,462, filed Oct. 30, 1997, now U.S. Pat. No. 6,004,489, issuing Dec. 21, 1999, which is a continuation-in-part of Ser. No. 08/647,579, filed May 13, 1996, now U.S. Pat. No. 5,756,016.

TECHNICAL FIELD

The present invention relates generally to extrusion processes and methods of designing an extrusion process to run at optimal conditions. More particularly, the present invention relates to a method for designing an extrusion process based on a given extrusion profile for a given extrusion press for a given extrusion material such that the resulting product is of high quality and is extruded at an optimal speed. Specifically, the present invention relates to a feed forward method for designing an extrusion process including the steps of determining optimal extrusion conditions for a particular extrusion press for a specific extrusion profile and then designing an extrusion die based on the optimal conditions maximizes the quality of the finished extruded product and the extrusion speed.

BACKGROUND OF THE INVENTION

Extrusion is the process of forcing material through a die having an extrusion profile to form a product having a cross section that matches the extrusion profile. The length of the extruded product is determined by the amount of material forced through the die. A typical aluminum window frame may be fabricated from extruded rails and stiles. A typical rail or stile has a relatively complicated cross section including a plurality of arms extending from a common spine. Additionally, each of the arms may have a plurality of members extending therefrom. In the past as the extrusion profile became more complex, the speed of the extrusion process had to be reduced to maintain a high quality product.

A depiction of a typical extrusion die known in the art may be seen in FIG. 1. The prior art extrusion die, indicated generally by the numeral 210, generally includes a die body 212 having an upstream face 214 and a downstream face 216 with a cavity 218 extending toward the upstream face 214 from the downstream face 216. An extrusion profile 220 is cut from the upstream face 214 through the die body 212 to the cavity 218. A wall 222 parallel to the upstream 214 and downstream 216 faces extends between the extrusion profile 220 and the cavity 218. This wall 222 can also be referred to as the undercut 222 of the die 210. The depth of the extrusion profile 220 is referred to in the art as the die land or the die bearing 224. The die land or bearing 224 is the portion of the die 210 that the material contacts as it is forced through the die 210. Such contact causes friction that creates heat and negatively affects material flow.

The length of the bearing 224 and the length of the undercut 222 affect the strength of the die 210. The strength of the die 210 is important because the die 210 is subjected to high pressures and high temperatures during the extrusion process. If the material surrounding the extrusion profile 220 is weak, the quality of the product is negatively affected. To increase the strength of the die 210, a longer bearing 224 and a small undercut 222 may be used. A long bearing 224, however, decreases the speed of the die 210 because of the friction created by the long bearing 224.

Thus, it is desirable to minimize the length of the bearing so that the maximum extrusion speed may be achieved while maintaining adequate strength for the die. Maximizing extrusion speed is extremely important to the extrusion industry because a die may be used to create miles of product over its lifetime. Thus, even a small increase in extrusion speed yields large benefits to the manufacturer.

Another feature of known dies 210 is a cavity 230 formed in the upstream face 214 of the die 210 to facilitate consecutive billets. Consecutive billets are required when the desired length of the product is longer than the capacity of the extrusion processor. To allow consecutive billets, a cavity 230 is carved out of the upstream face 214 of the die 210 around the extrusion profile 220. When the ram of the extrusion processor approaches the upstream face 214 of the die 210, the billet is cut and a portion of the extrusion material remains in the cavity 230. When the billet is cut, the act of cutting creates a force that tends to pull the material remaining in the cavity 230 back out of the die 210. To prevent the material from being pulled entirely out of the cavity 230, the cavity 230 is relatively deep. The depth is such that the angle indicated by the numeral 232 is typically less than 45 degrees. The depth of the cavity 230 prevents the cutting force from pulling the material all the way out of the die 210. Once the material is cut, the ram is then pulled back and another billet is inserted. The new billet welds itself to the material left over in the cavity and the extrusion process is continued.

The depth of the cavity 230 negatively effects the performance of the extrusion die 210. When the angle 232 formed by a line normal to the upstream face 214 at the corner of the cavity 230 and a line taken through that corner and the corner of the extrusion profile 220 and the bottom 234 of the cavity 230 is less than 45 degrees, the flow through the die 210 is restricted. As the material is forced against the die 210 in the extrusion processor, areas of material are forced into the corners and essentially stay in the corners during the extrusion process. This area is known as a dead area of flow and is indicated generally by the numeral 236 in FIG. 1. The dead area 236 creates friction between the rest of the flow and itself. A deep cavity 230 causes an additional dead area to form, as indicated by the numeral 238. The deep cavity 230 also acts as an additional length of bearing where the flow may flow against the cavity walls, as indicated by the numeral 240. The additional friction created by the dead area 238 and the extra bearing 240 is undesirable because it creates heat which degrades the surface finish of the final product. To reduce the affects of friction, the extrusion processor is run at slower speeds.

To design such a conventional die, a die designer typically relies on a trial and error method. The success of the die design often depends on the knowledge and experience of the die maker. A die is currently manufactured by first determining the desired profile of the final extruded product. The profile is then cut out of the die body. When the die designer first cuts the profile, the designer intentionally leaves the bearing longer than desired so that bearing length may be removed, if needed, after a test run. The die is then placed in an extrusion processor and run through a series of tests. If the die functions properly, the die is then used to create final products. A problem with this method is that the bearing of the die has been left intentionally long and the die must be run at slow speeds.

If the designer discovers problems with the die during the test runs or desires a faster die bearing, the designer takes the die out of the processor and makes adjustments. The magnitude of these adjustments often depends on the knowledge and experience of the designer. One typical adjustment that may be made is the removal, or shortening of the bearing. The known methods for removing bearing are to shorten the entire bearing or to shorten a portion of the bearing to create a stepped bearing. Once this has been done, the die is repositioned and additional tests are performed. One problem with creating a stepped bearing is that a die having a stepped bearing forms a product with surface lines at the location of the bearing step. Such lines are undesirable and must be removed by a further process.

The re-configurations and tests are repeated until a satisfactory product and extrusion speed are attained. It should be noted that bearing length cannot be added back to the die after it has been removed. Thus, if too much bearing is removed, the die must be scrapped and the process repeated. For this reason, the die bearing is always left longer than necessary. The added length causes the extrusion processes to be run slower than possible. Even a knowledgeable die designer with significant experience typically requires approximately three tests to create a satisfactory die. The number of runs and the labor required to perfect the die undesirably increases the costs of forming the die.

The speed and temperature at which the extrusion press is operated are also determined by a similar trial and error method. When a new die is placed in the press, the apparatus is run at a initial test speed and temperature and the quality of the extruded product is examined. If the surface quality is acceptable, the speed of the machine is increased and the product checked again. When the product quality becomes unacceptable, the speed is backed down and the temperature is adjusted until a good quality product is produced. The knowledge and experience of the person operating the apparatus effects the length of this process. In addition to the amount of downtime experienced by the set up of the process, a significant amount of material is wasted performing the test runs. It is thus desirable to provide a method for designing an extrusion process that substantially reduces the amount of set up time and reduces test runs.

This method for setting up the extrusion press bases the press set up around the die characteristics. In other words, the die is designed first and then the extrusion press parameters are set based on the performance of the extrusion die. The result of this method is that the extrusion press is often not run at optimal extrusion conditions because the extrusion die has not been designed for optimal conditions. As such, it is desired in the art to provide a method for designing an extrusion process that first calculates the optimal press conditions and then designs the extrusion die based on these optimal conditions.

SUMMARY OF THE INVENTION

It is, therefore, a primary object of the present invention to provide a method for designing an extrusion process and extrusion die for operation under optimal conditions.

Another object of the present invention is to provide a method for designing an extrusion process wherein the extrusion die is designed around the optimal extrusion process parameters instead of basing the process parameters on the extrusion die.

A further object of the present invention is to provide a method for designing an extrusion process and extrusion die wherein the optimal process parameters and die design may be determined on a computer that also controls the equipment for forming the die and operating the extrusion press.

These and other objects of the invention, as well as the advantages thereof over existing and prior art forms, which will be apparent in view of the following detailed specification, are accomplished by means hereinafter described and claimed.

In general, a method for designing an extrusion process includes the steps of first determining the optimal extrusion process parameters and then designing an extrusion die based on these parameters. The invention provides a method that defines boundary lines on an extrusion process limitation chart having temperature and speed axes. The optimum extrusion process parameters are then selected in the area defined by the boundary lines.

To acquaint persons skilled in the arts most closely related to the present invention, two preferred embodiments of a method for designing an extrusion process and die that illustrates a best mode now contemplated for putting the invention into practice is described herein by, and with reference to, the annexed drawings that form a part of the specification. The exemplary method is described in detail without attempting to show all of the various forms and modification in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

BRIEF DESCRIPTION OF THE DRAWINGS

Similar numbers refer to similar parts throughout the specification.

DESCRIPTION OF THE PREFERRED EMBODIMENTS

1. Extrusion Die Having Pre-deformed Pocket and Continuous Bearing

Figure 1:
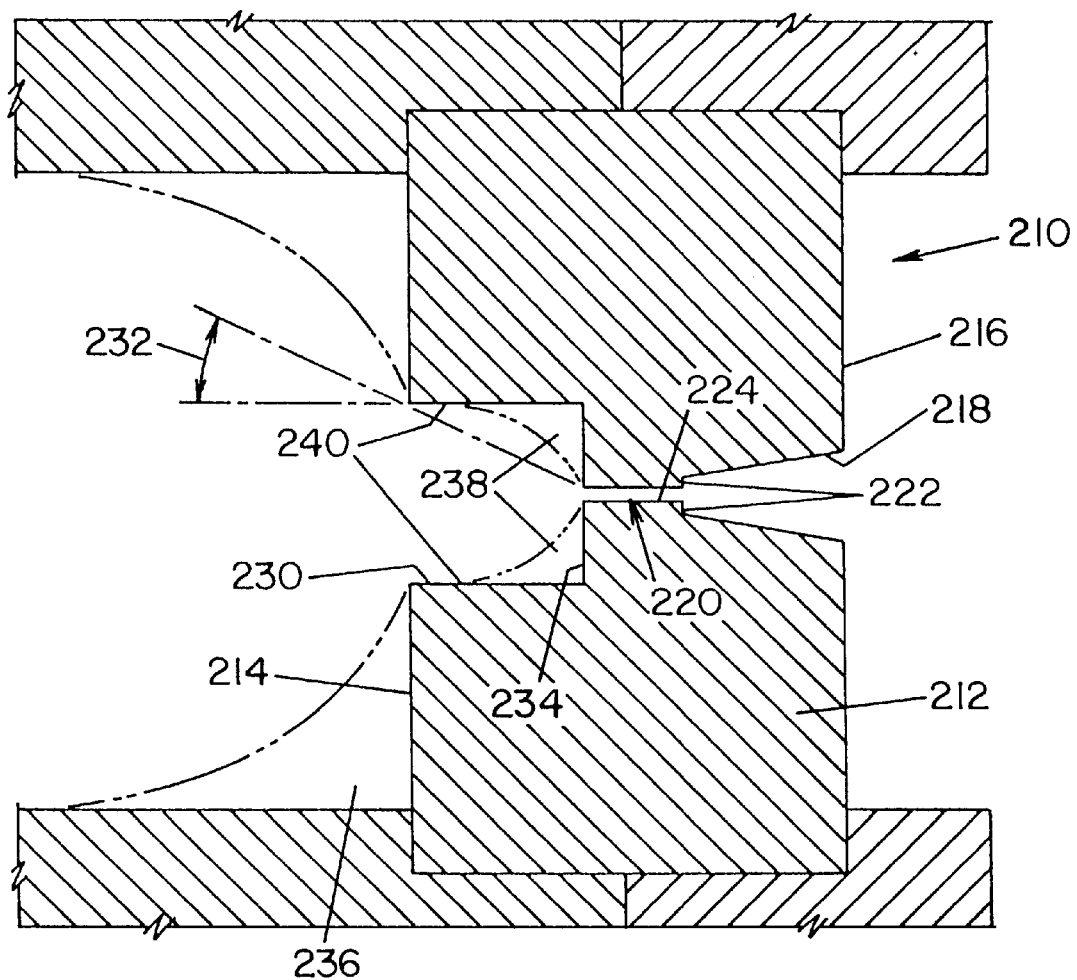
FIG. 1 is a sectional side view of a typical prior art extrusion die.
Figure 2:
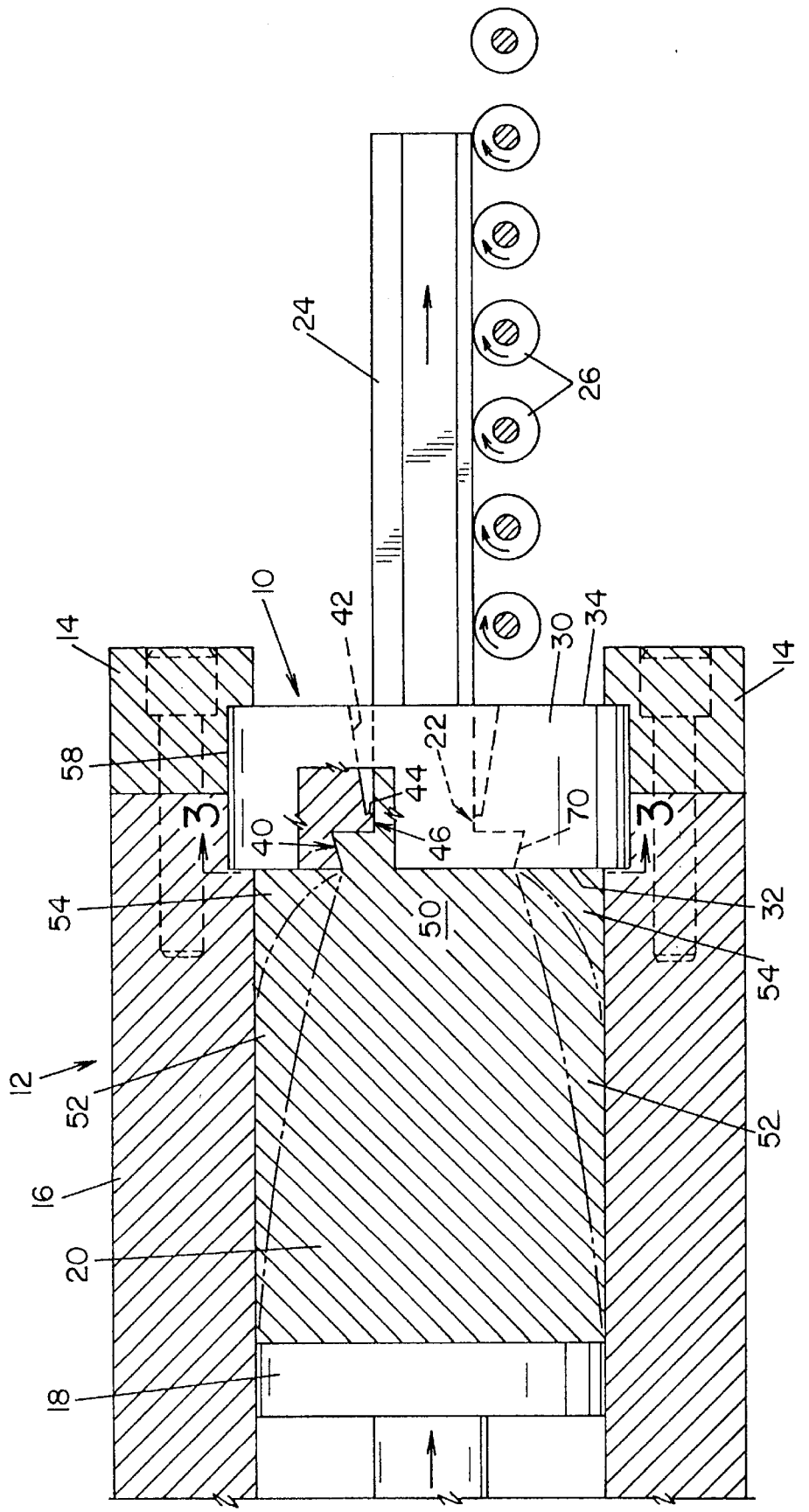
FIG. 2 is a side view partially in section of a typical extrusion processor having an extrusion die according to the present invention.

One representative form of an extrusion die embodying the concepts of the present invention is designated generally by the numeral 10 on the accompanying drawings. In FIG. 2, the representative extrusion die 10 is depicted in an extrusion processor 12. The die 10 is clamped against the processor 12 by a plurality of clamps 14 that are bolted to the main body 16. The processor 12 includes a ram 18 that is operable to push a billet 20 of extrusion material towards the die 10. The force created by the ram 18 pushes the material 20 through an extrusion profile 22 cut through the die 10. The material 20 emerges from the die 10 as an extruded product 24 having a cross section matching the extrusion profile 22. The product 24 emerging from the die 10 may be supported by a plurality of rollers 26 as depicted in FIG. 2.

An extrusion die 10 according to the present invention includes a main body portion 30 having an upstream face 32 and a downstream face 34 with an extrusion profile 22 cut there through. It is to be noted that the shape of the extrusion profile 22 depicted in the figures is merely exemplary and that the concepts of the present invention apply to dies 10 having other extrusion profiles. The extrusion profile 22 is surrounded by a pocket 40 that permits welding of consecutive billets 20 and improves material flow into the die 10. An angled undercut cavity 42 extends into the main body portion 30 of the die 10 from the downstream face 34 of the die. An undercut 44 that is generally parallel to the upstream 32 and downstream 34 faces of the die 10 may extend between the angled undercut cavity 42 and the extrusion profile 22.

Figure 3:
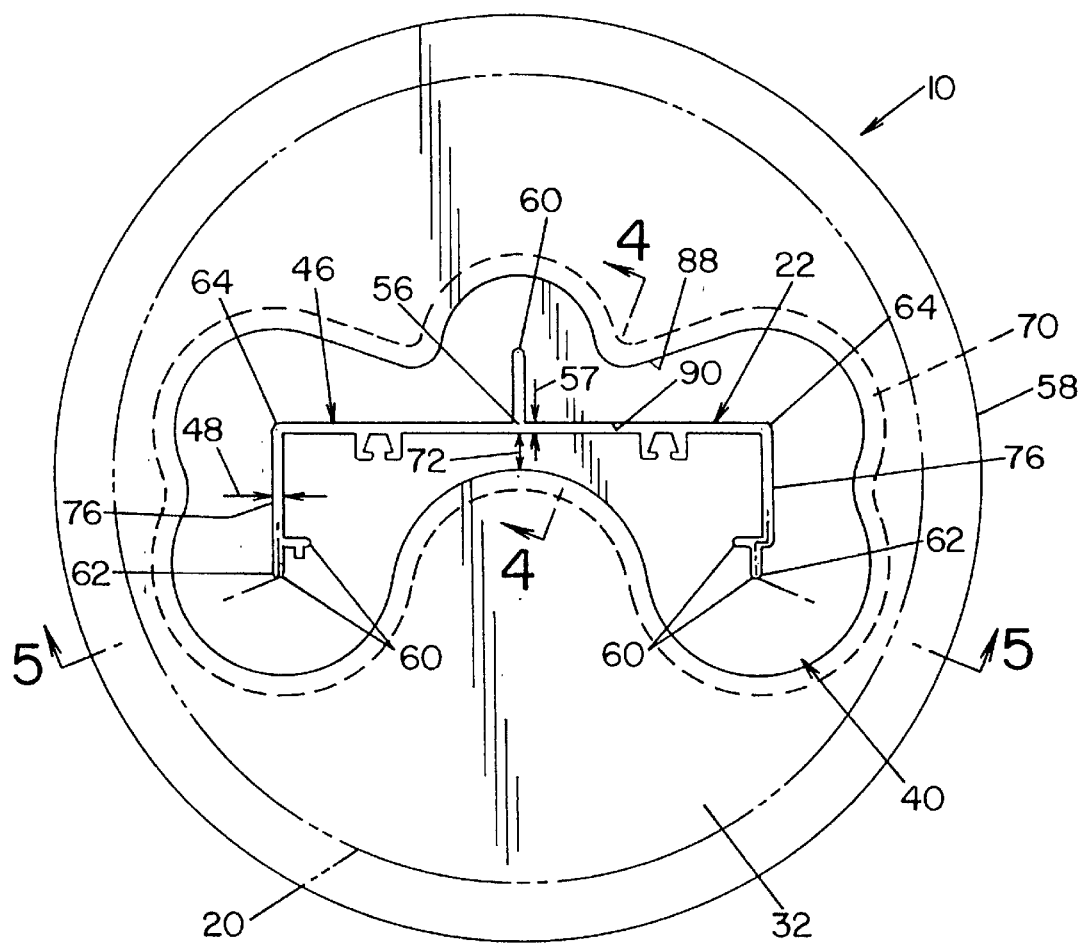
FIG. 3 is taken along line 3—3 in FIG. 2 and depicts the front view of the extrusion die according to the present invention.

The depth of the extrusion profile 22 is referred to in the art as the die land or the die bearing 46. In the past, the length of the bearing 46 was exclusively used to control the material flow through the die 10. Thus, it is known that a small bearing 46 allows faster flow and a longer bearing 46 slows the flow of material 20 through the die 10. These results are chiefly the result of the friction created between the flowing material and the bearing 46. In order to create a die 10 that may be run at a fast extrusion speed, it is necessary to limit the length of the bearing 46 as much as possible. However, in a relatively complex extrusion profile 22, such as the extrusion profiles depicted in the drawings, the material flow through the profile 22 is not uniform. In areas of the profile 22 where the wall thickness of the extrusion profile 22 is small, the limited size of the opening limits the flow of the material through the profile 22. It should be noted for clarity that the term wall thickness refers to the wall thickness of the extrusion profile 22 as indicated by the numeral 48 on FIG. 3. Thus when a uniform bearing 46 is used with such a profile 22, the material flows faster through certain areas of the profile 22 than others. Such variable flow leads to products 24 having unacceptable product dimensions, such as twisting along the longitudinal axis of the product.

To control the material flow, the present invention in part utilizes a continuous bearing 46 having a length that varies in accordance with the wall thickness of the extrusion profile 22 and location of that wall thickness with respect to the material flow. It is known that the material flow encounters the least amount of friction at the center of the flow, as indicated by the numeral 50, and the most friction at the edges of the flow, as indicated by the numeral 52. The geometry is such that a dead area 54 is formed where the material flow contacts the upstream face 32 of the die 10. The bearing 46 of the present invention is designed to anticipate the variable material flow and control the flow through the die 10.

To design the bearing 46, the die designer first determines the fastest and slowest areas of the extrusion profile 22. The fastest area of the profile 22 will generally be the area having the largest wall thickness that is closest to the center of the die 10. However, those persons skilled in the art of die design can generally recognize various factors that may move the fastest area away from the center of the die. In the extrusion profile 22 depicted in the drawings, the fastest area of the extrusion profile 22 is indicted by the numeral 56. This location is fastest because it is at the center of the die 10 and has a wall thickness 57 that is approximately as large as the other wall thicknesses, such as indicated by the numeral 48. The slowest area of the extrusion profile 22 will generally be that area of the extrusion profile 22 that is closest to the edge 58 of the die and is an end 60 or an area having a narrow wall thickness. In the extrusion profile 22 depicted, the slowest areas are indicted by the numeral 62.

To control the material flow through the die 10, the bearing 46 is adjusted to be longest at the fastest area 56 and shortest at the slowest area 62. As explained above, a short bearing 46 will increase the flow rate through the die 10 while a long bearing 46 will slow the flow rate through the die 10. The designer next determines the minimum bearing 46 that may be practically formed for the die 10 being designed. The length of the minimum bearing 46 depends on various factors including the strength of the die material, the pressure and temperature of the extrusion process, and the fabrication capabilities available to the die designer. The designer sets the minimum bearing 46 at the slowest area 62 of the profile, as may be seen in FIG. 5.

The designer then determines the length of the bearing 46 at the fastest area 56 of the extrusion profile 22. If the wall thickness of the extrusion profile 22 at the fastest area 56 is approximately equal to the wall thickness of the extrusion profile 22 at the slowest area 62, the length of the bearing 46 at the fastest area 56 is equal to the length of the bearing 46 at the slowest area 62 multiplied by a number in the approximate range of 1.4 to 2.0. Thus, the length of the bearing 46 at the fastest area 56 is always greater than the length of the bearing 46 at the slowest area 62.

In the following examples, the numbers selected for the length of the bearings 46 and for the various wall thicknesses are exemplary in nature and are intended only to demonstrate how the method of determining the bearing 46 is accomplished. The numbers defining the various approximate ranges have, however, been discovered by the inventor to be useful for achieving the results of the present invention.

An example of calculating the bearing is given below for the extrusion profile 22 depicted in the drawings having the given exemplary dimensions. First the designer determines the minimum possible bearing that may be created in the die 10. If the minimum bearing 46 length is determined to be 0.4 units, the bearing 46 at the fastest area 56 would be 0.4 units multiplied by a number in the approximate range of 1.4 to 2.0. If the number 1.6 were arbitrarily selected for the purpose of this example, the length of the bearing 46 at the fastest area 56 would be 0.4 * 1.6=0.64 units.

If the wall thickness is larger at the fastest area 56 than at the slowest area 62, the approximate range of 1.4 to 2.0 is increased by a first factor. The first factor is determined by multiplying the ratio of the wall thickness at the fastest area 56 to the wall thickness at the slowest area 62 by a number in the approximate range of 1.25 to 1.65. Thus, if the wall thickness at the slowest area 62 is 1.4 units and the wall thickness at the fastest area 56 is 1.6 units, the ratio is 1.14. (1.6 divided by 1.4) The first factor is thus 1.14 multiplied by a number in the approximate range of 1.25 to 1.65. If 1.45 were selected, the first factor would be 1.14 * 1.45=1.65. The approximate range is thus increased by 1.65. Therefore, the ratio of the bearing length at the fastest area 56 over the length of the slowest area 62 falls into the approximate range of 2.31 to 3.3 (1.4 * 1.65 to 2.0 * 1.65) Thus, the length of the bearing at the fastest area 56 of the extrusion profile would be 0.4 units (the length of the bearing at the slowest area 62) multiplied by a numeral in the approximate range of 2.31 to 3.3. If the numeral 2.7 were selected, the length of the bearing at the fastest area 56 would be 0.4 * 2.7=1.08.

If the wall thickness is smaller at the fastest area 56 than at the slowest area 62, the approximate range of 1.4 to 2.0 is decreased by a second factor. The second factor is determined by multiplying the ratio of the wall thickness at the slowest area 62 to the wall thickness at the fastest area 56 by a number in the approximate range of 1.25 to 1.65. Thus, if the wall thickness at the slowest area 62 is 1.4 units and the wall thickness at the fastest area 56 is 1.2 units, the ratio is 1.17. (1.4 divided by 1.2) The second factor is thus 1.17 multiplied by a number in the approximate range of 1.25 to 1.65. If 1.45 were selected, the second factor would be 1.17 * 1.45=1.70. The approximate range is thus decreased by 1.70. Therefore, the ratio of the bearing length at the fastest area 56 over the length of the slowest area 62 falls into the approximate range of 0.82 to 1.18 (1.4/1.7 to 2.0/1.7) Thus, the length of the bearing at the fastest area 56 of the extrusion profile would be 0.4 units (the length of the bearing at the slowest area 62) multiplied by a numeral in the approximate range of 0.82 to 1.18. If the numeral 1.1 were selected, the length of the bearing 46 at the fastest area 56 would be 0.4 units * 1.1=0.44 units.

Figure 5:
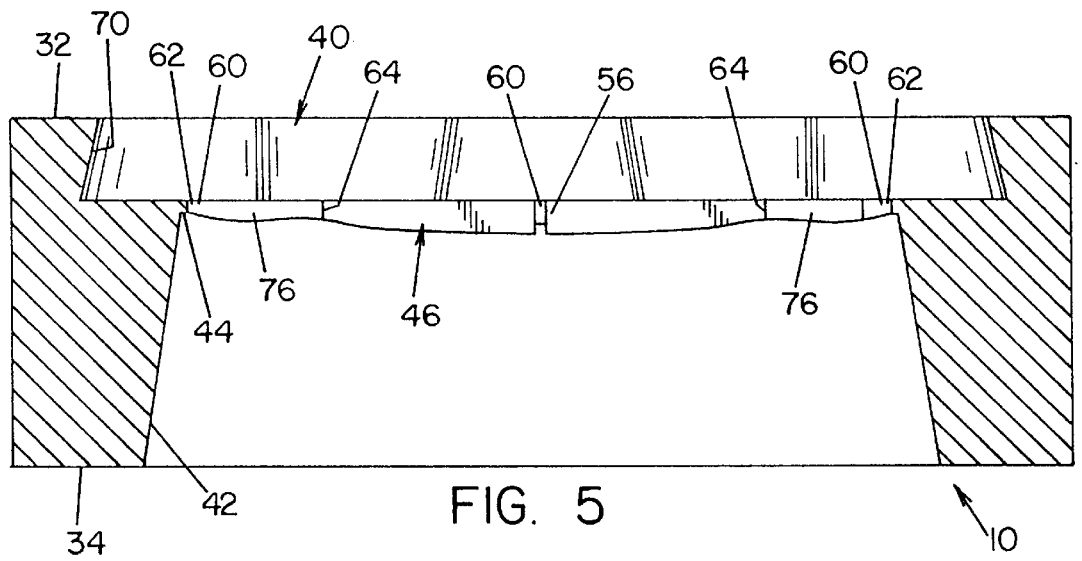
FIG. 5 is a cross section taken along line 5—5 in FIG. 3 and depicts a side view of the continuous bearing of the extrusion die.

For points on the extrusion profile 22 between the fastest area 56 and the slowest area 62, the bearing lengths are interpolated from the known values. If the wall thickness of the extrusion profile 22 is generally constant from the fastest area 56 to the slowest area 62, the bearing length is simply linearly interpolated. When this method is used, the bearing length appears as is shown in FIG. 5. In FIG. 5, the bearing 46 is shortest at the slowest areas 62 and is longest at the fastest area 56.

For points along the extrusion profile 22 that have a wall thickness different from the wall thickness at the fastest area 56, the bearing size determined from the linear interpolation is adjusted by a third factor. Where the wall thickness is greater than the fastest area 56, the bearing size is increased by a factor between 1.25 to 1.65 times the ratio of wall thickness at that point to the wall thickness at the fastest area 56. If the wall thickness at that point is less than the wall thickness that of the fastest area 56, the bearing length of decreased by a fourth factor. The fourth factor is between 1.25 to 1.65 times the ratio of the wall thickness at the fastest area 56 to the wall thickness at that point. Once the bearing lengths are adjusted for the wall thickness discrepancies, the bearing 46 is interpolated again to take into account the new lengths.

Lastly, the bearing lengths are adjusted based on the geometry of the extrusion profile 22. If the point is located at an end point 60 of the extrusion profile 22, the bearing length is decreased by 30 to 50 percent. Similarly, if the point is located at a corner, such as the corner indicated by the numeral 64, the length of the bearing 46 is decreased by 10 to 30 percent. After the adjustments for the geometry are made, the overall lengths are interpolated again to determine the final bearing lengths for all points in between those specifically calculated points. By following these steps, a die designer may determine a continuous bearing 46 configured specifically for the chosen extrusion profile 22. The continuous bearing 46 controls the flow of material through the die 10 and works to equalize the effects of friction on the material flow. Furthermore, by minimizing the length of the bearing 46 at the slowest areas 62 of the extrusion profile 22, the method has insured that the extrusion processor 12 may be run as fast as the extrusion profile 22 will allow.

The bearing 46 described above is most effective when employed in conjunction with a pocket 40 according to the present invention. A pocket 40 may be seen in the drawings as being a cavity in the upstream face 32 of the die 10 generally surrounding the extrusion profile 22. The pocket 40 may either be carved into the die body 30 or be formed in a plate (not shown) which would be positioned adjacent the upstream face 32 of the die 10. The pocket 40 has a continuous tapered sidewall 70 that permits consecutive billets 20 to be welded together in conjunction with the die 10. The walls 70 are tapered between 0 to 30 degrees.

The tapered sidewall 70 enables the welding of consecutive billets even though the depth 74 of the pocket 40 is generally less than that of the prior art. As described above in the Background of the Invention section, welding consecutive billets is often desirable. To weld two billets, the first billet is cut when the ram 18 approaches the upstream face 32 of the die 10. The act of cutting creates a force that urges the material 20 left in the pocket 40 back out of the pocket 40. In the past, the walls 70 of the pocket 40 were simply extended so that the force could not pull the material 20 all of the way out. In the present invention, the walls 70 of the pocket 40 are tapered to help retain the material 20 in the pocket 40 when the billet is cut. As such, when the cutting action creates a force, the walls 70 act to counter this force. Thus, the depth 74 of the pocket 40 does not have to be as deep as in the prior art and the depth is substantially decreased because the material is retained by the tapered walls 70.

The pocket 40 is also configured to improve the material flow into the die 10 by changing the angle of material flow into the extrusion profile 22. In the prior art, the material 20 would be pushed directly against the upstream face 214 of the die 210 and then would be forced around sharp corners into the extrusion profile 220. But, in the present invention, the pocket 40 starts to bend the flow lines of the material 20 before it reaches the upstream face 32 thus creating an artificial material entry angle. The artificial angle improves the flow of the material 20 such that it may flow more freely into the extrusion profile 22 which reduces the material strain rate, smooths the material flow, and equalizes the pressure of the material flow. The material flow lines, and thus the material flow, is improved with a pocket 40 because the configuration (depth and width) of the pocket 40 is designed to anticipate the material flow path and the material entry angle. In the prior art, the depth of any pocket is much deeper and the material entry angle, or pocket angle, is always less than 45 degrees, resulting in large amounts of friction being generated. The large amount of friction results in poor surface finishes and poor overall quality. When the material flow lines are directed with a pocket 40 of the present invention, the amount of friction created between the material 20 and the die 10 is greatly reduced allowing the extrusion processor 12 to be run at increased speeds while providing a high quality product.

In addition to the benefit of faster extrusion speed, the pocket 40 allows the die designer to make adjustments to the die 10 without adjusting the bearing 46. Because of the location and size of the bearing 46, it is often difficult to adjust the bearing 46 once it has been formed. On the other hand, the pocket 40 is relative easy to alter after it has been formed. During the die 10 test procedure, if the die designer desires to change the affect of the die 10 on the material flow, the designer may either carve more of the pocket 40 out or, unlike changes to the bearing 46, may add material back to the pocket 40. Adding material to the pocket 40 is possible by simply welding material into place and grinding it down to be smooth.

In general, the dimensions of a pocket 40 are determined by the anticipated speed of material flow at the point along the extrusion profile 22 being determined. For instance, when the point is in a slow flow area, the pocket width will be larger than if the point to be determined is at a fast area of flow. A pocket 40 for an extrusion profile 22 is determined by first setting a minimum width 72 at the fastest area 56 of the extrusion profile 22. The minimum width 72 may be determined from the designer's skill in the art and the overall dimension of the extrusion profile 22 with respect to the diameter of the die 10. The depth 74 of the pocket 40 is then determined by multiplying the minimum width 72 by a number in the approximate range of 1.2 to 2.0.

The selection of the minimum width is limited, however, by the desire to form a pocket 40 that is configured such that the pocket angle 82 formed by the reference line 84 and the reference line 86 is in the approximate range of 25 degrees to 45 degrees. Reference line 84 extends perpendicular to the upstream surface 32 through the edge 88 of the pocket 40. Reference line 86 extends through the edge 88 of the pocket 40 to the edge 90 of the extrusion profile 22 directly behind that point on the edge of the pocket 40. In general, when the pocket angle 82 is small, the pocket 40 slows the flow. However, when the pocket angle 82 is large, the flow encounters little friction and is fast. The pocket angle 82 is varied by varying the pocket width because the pocket depth 74 is fixed.

The designer then determines the width of the pocket 40 at the points 76 along the extrusion profile 22 that are closest to the edge 58 of the die 10. For these points 76, the pocket width is the minimum pocket width 72 multiplied by a number in the approximate range of 1.5 to 2.5. The pocket 40 is larger at these points 76 because the friction between the material flow and the extrusion processor slows the material flow. Next, the designer further increases the width of the pocket 40 for those points along corners 64 or endpoints 60. The width for these points 60 and 64 is further increased by a number in the approximate range of 1.2 to 2.0. At the slow areas, the pocket angle is desirably in the approximate range of 45 degrees to 70 degrees. After pocket widths for these points are determined, the overall pocket 40 layout is determined by linear or higher order interpolations.

Thus, for the areas of the extrusion profile 22 that are slow, the width of the pocket 40 is large. These areas also have the smallest bearing 46 so that less friction is created in the die 10. Those areas of the extrusion profile 22 that are fast have the small pocket width. The fast areas also have the long bearing 46. The combination of the bearing 46 and the pocket 40 allows the die designer to create a die 10 that improves the material flow. Once the material flow is improved, the material flows evenly through the die 10 resulting in an improved product 24 having improved material properties and a satisfactory surface finish. The improved material flow also reduces friction in the die 10 thus permitting the speed of the extrusion through the die 10 to be increased. By following the method of the present invention, the number of attempts to create a die 10 forming a satisfactory product is reduced from approximately 3 to approximately 1. The number of attempts is reduced because the die bearing 46 and pocket 40 have been specifically configured based on the extrusion profile 22 in that die 10.

Figure 6:
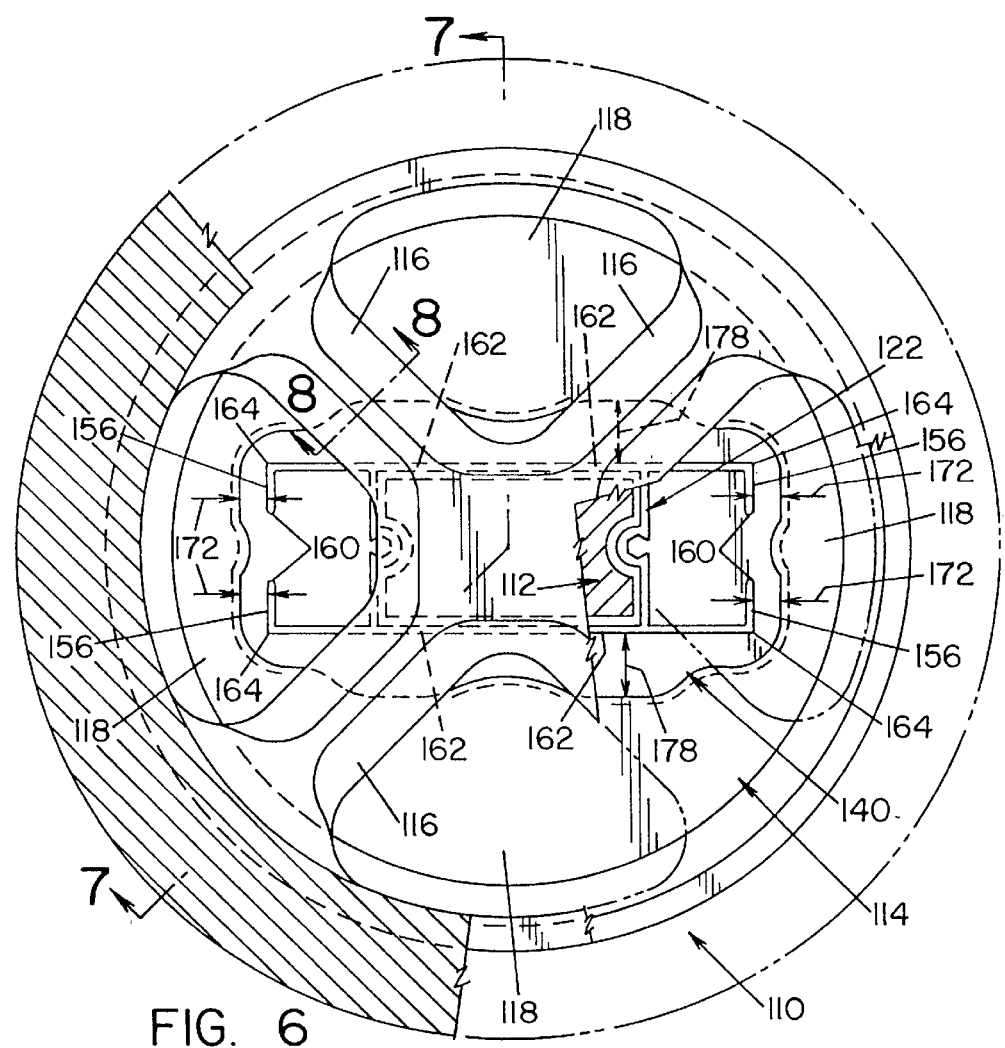
FIG. 6 is an end view of a hollow extrusion die according to the present invention.
Figure 7:
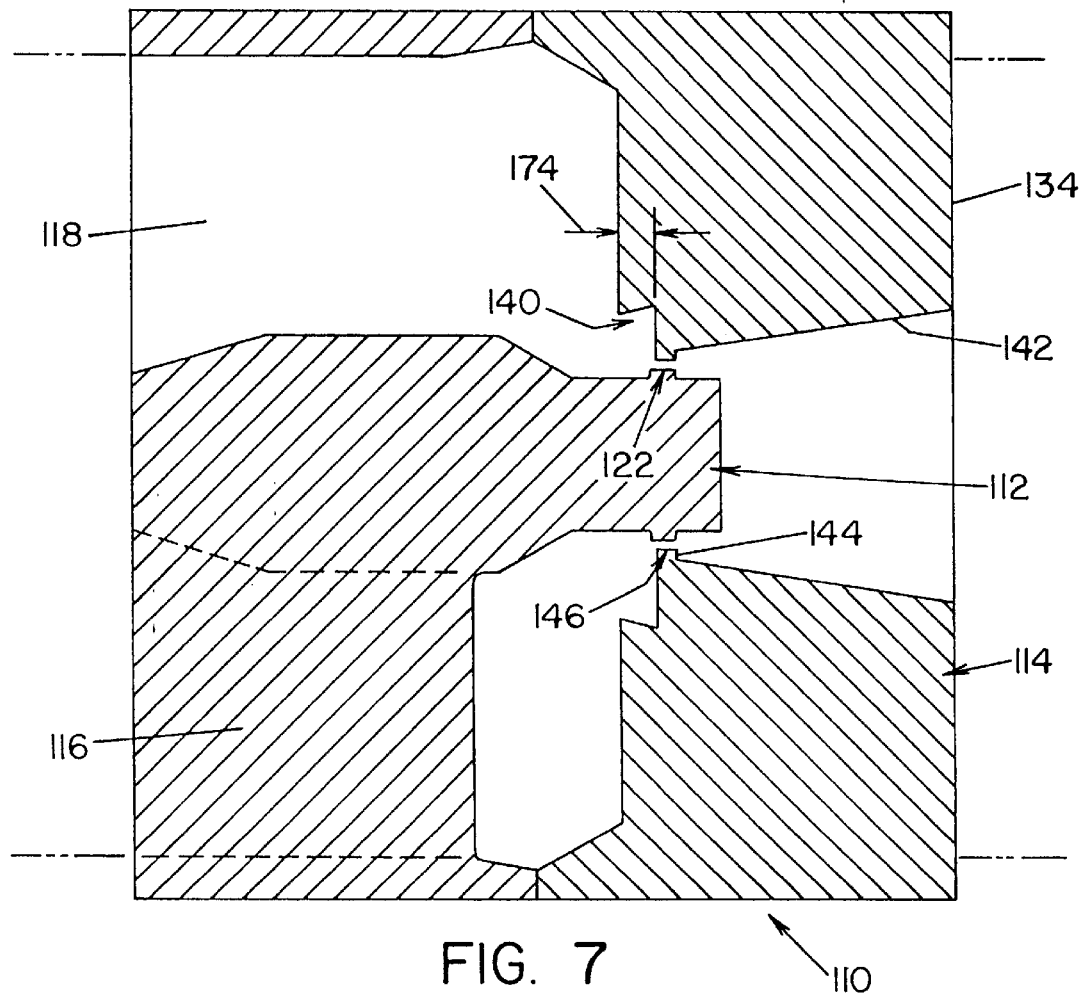
FIG. 7 is a sectional view of the hollow die taken along line 7—7 in FIG. 6.
Figure 8:
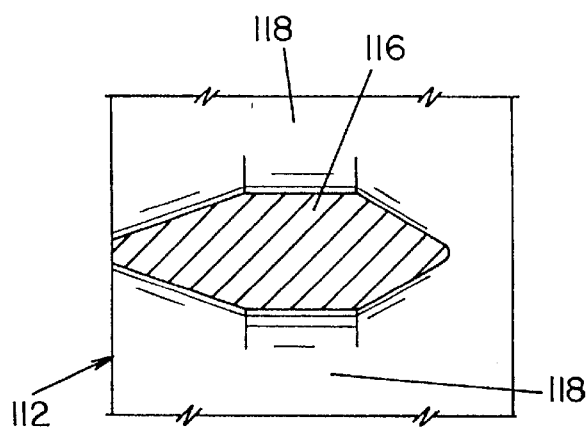
FIG. 8 is a sectional side view of a web taken along line 8—8 in FIG. 6.

The foregoing description has been directed toward a solid die 10. The present invention also is useful for increasing the speed of a hollow extrusion die 110. A typical hollow extrusion die 110 is depicted in FIGS. 6–8. A hollow die 110 is used to form products such as a tube that have a hollow portion. A hollow die 110 has a male die 112 that is disposed in a female die 114. A plurality of webs 116 support the male die 112 in the female die 114. The openings that permit material to flow around the webs 116 supporting the male die 112 are referred to in the art as poles and are indicated by the numeral 118 on the accompanying drawings. The space between the male die 112 and the female die 114 is the extrusion profile 122.

The female die 114 of the hollow die 110 has similar elements of the solid die 10. For instance, the hollow die 110 may be placed in the same type of extrusion processor 12 as the solid die 10. The hollow die 110 also has an undercut cavity 142 extending into the downstream face 134. The hollow die 110 also utilizes a pocket 140 to manage the material flow into the extrusion profile 122. An undercut 144 extends between a bearing 146 and the undercut cavity 142.

In general, the length of the bearing 146 will increase from the center of a web 116 in the direction of the center of a pole 118. The bearing length is smallest under the webs 116 because the material must flow around each web 116 to reach the extrusion profile 122 as may be seen in FIGS. 7 and 8. Thus, the bearing 146 is shortest under the webs 116 so that the material will encounter less friction in the extrusion profile 122 at these locations than in those locations that are directly under the poles 118 where the material flows directly into the extrusion profile 122.

As with the solid die 10 design, the designer first determines the shortest bearing that is reasonably possible to manufacture. The designer sets this the minimum bearing to be the bearing length at the slowest areas of the extrusion profile 122 which are those points 162 directly under the webs 116. The designer then determines the length of the bearing 146 at the fastest area 156 of the die 110 (those areas directly under poles with the largest wall thickness) to be the minimum bearing length multiplied by a number in the range of 1.11 to 1.67. The length of the bearing for the points in between those points is determined by interpolation. Additionally, the rules for adjusting the bearing 146 based on wall thickness and geometry also apply. Thus, if the point to be determined is along a corner, such as indicated by the numeral 164, the bearing will be decreased by 10 to 30 percent. If the point to be determined is disposed at an endpoint 160 of the extrusion profile 122, the bearing length is decreased by 30 to 50 percent.

In general, the determination of the size of the pocket 140 for a hollow die 110 follows the same types of rules used to determine the pocket widths for the solid die 10. In a hollow die 110 configuration, the pocket width increases when it is under a web 116 and decreases when it is under a pole 118. The designer first determines a minimum pocket width based on his experience and the relative size of the extrusion profile 122 with respect to the die 110. The minimum pocket width 172 is placed at the fastest areas 156 of the extrusion profile 122, typically directly under a pole 118. The pocket depth 174 is then calculated to be approximately 1.2 to 2.0 times the minimum width 172. Again, the pocket angle for the fastest area should be in the approximate range of 25 degrees to 45 degrees.

The designer then calculates the pocket width 178 for the slowest area 162 of the extrusion profile 122. The slowest area 162 is an area of the extrusion profile 122 having a small wall thickness that is directly under a web 116. The width of the pocket 140 at these points is 2.0 to 5.0 times the minimum width. However, it is desired that the pocket angle at the slowest areas be in the approximate range of 45 degrees to 70 degrees. Again, the pocket widths for the remaining points may be calculated from linear or higher order interpolations. In addition, the widths may be increased or reduced based on the geometry of the extrusion profile 122. Thus, at tight corners 164, the width may be increased while at open areas, the width may be decreased.

Figure 4:
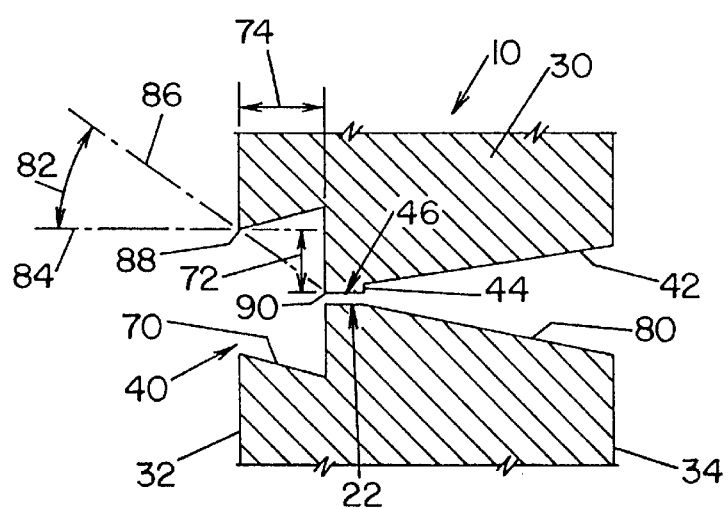
FIG. 4 is taken along line 4—4 in FIG. 3 and depicts a partial cross section of the extrusion die according to the present invention.

For either a solid die 10 or a hollow die 110, after the bearing 46 and 146 and pocket 40 and 140 dimensions have been determined, the dimensions may be given to computer-controlled manufacturing machines that are designed to cut a die by following a programmed tool path. As such, the machines can be operated to cut the extrusion profile 22 and 122 into the dies 10 and 110 with or without the undercut 44 and 144. In general a die without an undercut 44 and 144 is stronger than die having an undercut 44 and 144. The die without the undercut 44 and 144 is significantly stronger than a die having an undercut 44 and 144 even though the bearing 46 and 146 of the die may be significantly shorter. FIG. 4 depicts the die 10 having one half formed with the undercut 44 shown in FIG. 2 and one half shown without an undercut 44. The half without the undercut 44, indicated by the numeral 80 is more resistant to the bending forces of the material being forced through the extrusion profile 22. The pocket 40 and 140 may also be formed by programming a tool path into an appropriate machine. The tool path for the bearing 46 and 146 may be determined by knowing the angle of the cutting wire for the cutting machine and the depth of the pocket 40 and 140.

Figure 9:
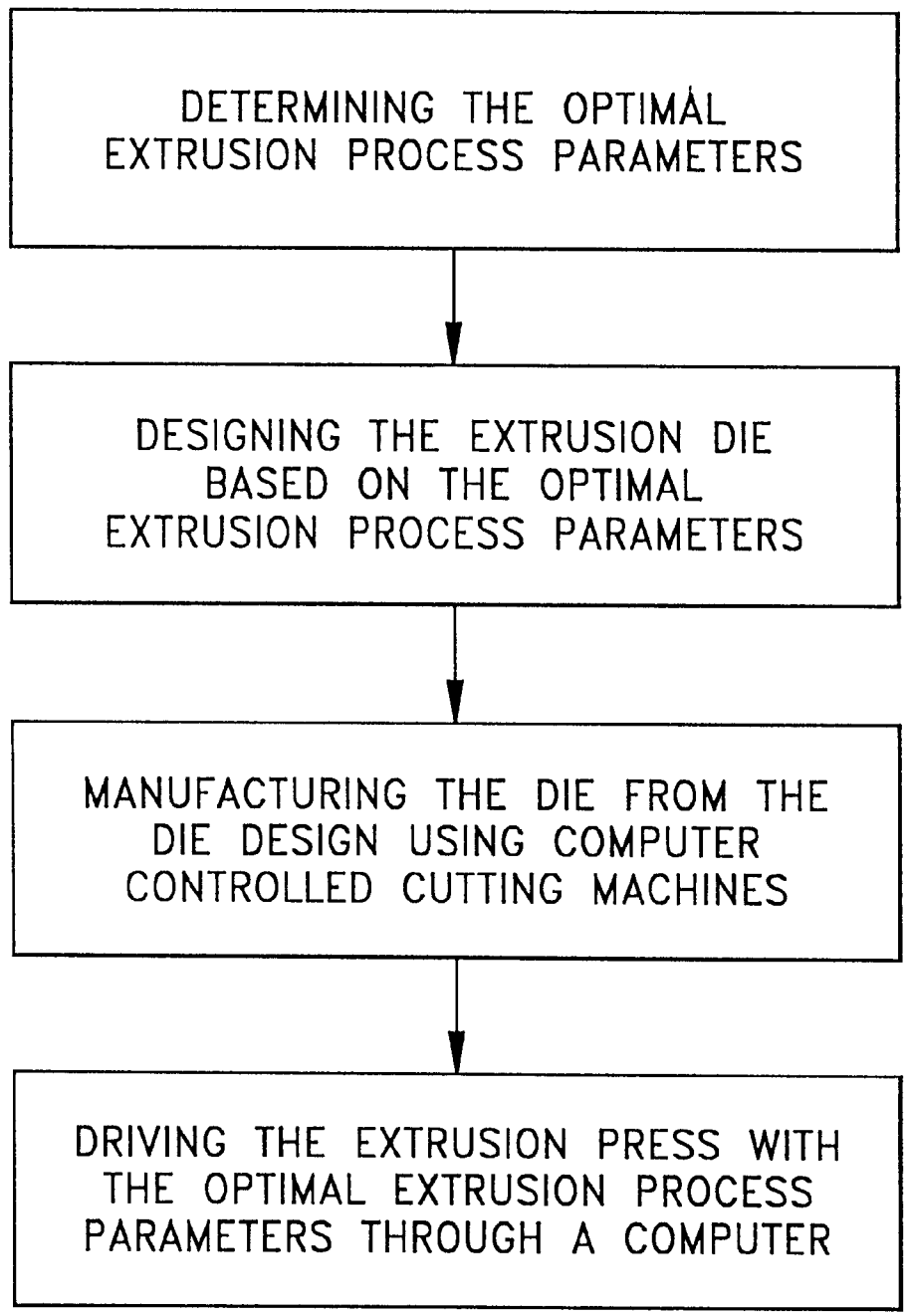
FIG. 9 is flow diagram depicting the steps of the method of designing an extrusion process according to one embodiment of the present invention.

2. Method of Designing an Extrusion Process and Extrusion Die Based on Optimal Extrusion Press Characteristics The design steps of the method for designing an extrusion process are depicted in the flow diagram shown in FIG. 9. The method of the present invention is particularly useful for designing extrusion processes for aluminum extrusion. As can be understood from the steps in the drawing, the design method of the present invention involves interrelating all of the extrusion process steps together so that an extrusion die is designed and manufactured for a specific extrusion press for a specific extrusion profile such that the process may be run at optimal conditions. The process of the present invention first determines the optimal press parameters for running an extrusion for a particular extrusion profile. These optimal parameters are then used to design and manufacture the actual extrusion die. Lastly, the process includes the steps of running the extrusion press based on the optimal conditions.

It is generally always desirable in the art to run an extrusion process as fast as possible so that a higher quantity of product may be produced. As the quantity rises, the profit for the product rises. However, it is often true that the quality of the product decreases as speed increases. A lower quality decreases the profit. Thus, an optimal process may be described as one that runs as fast as possible while maintaining acceptable quality in the extruded product.

The first step of the process is to determine the optimal extrusion process parameters for a specific extrusion press given a specific material and a specific extrusion profile. It may be understood that these parameters will vary for different presses, materials, and profiles. For instance, some materials are easier to extrude than others. These materials will inherently provide for a faster extrusion speed compared to other materials that are not as easy to extrude. Another example is that a relatively complicated extrusion profile will inherently have to be run at a slower speed than a relatively simple profile due to the increased friction of the complicated profile. It may also be understood that press characteristics will influence the optimal parameters.

Figure 10:
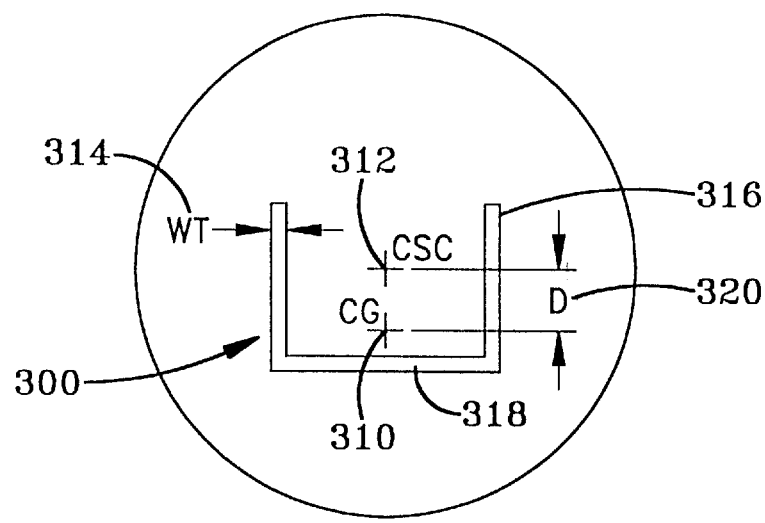
FIG. 10 is a front view of an extrusion profile.

In one embodiment of the present invention, a computer program has been developed that automatically gathers and calculates this information from a full scale drawing of the extrusion profile and property/press databases. In other embodiments of the invention, the information must be manually gathered. FIG. 10 schematically depicts an extrusion profile 300. The required information includes:

1. Characteristics of the extrusion profile 300.
   a. the center of gravity (310) of the extrusion profile,
   b. the center of a circumscribed circle (312) of the extrusion profile,
   c. the wall thickness (314) of the extrusion profile,
   d. the perimeter of the extrusion profile (316),
   e. the area of the extrusion profile (318),
   f. the location of the extrusion profile, and in turn, the distance (320)from the center of the die (312) to the center of gravity (310) of the extrusion profile (300).

After the designer has obtained the characteristics of the extrusion profile, the designer must obtain information about the material to be extruded, the extrusion press, and specifications for the final extruded product. The material properties may be found in standard textbooks and materials books known in the art. If a material is not specifically listed, standard tests such as compression or torsion testings may be conducted to gain data concerning the material behavior, material properties, and material working range. The material flow stress is required and is a function of the temperature and the strain rate of the material. This property can be determined by standard testing known in the art.

The designer must then obtain the characteristics of the extrusion press for which the process is being designed for. This information is typically available for the manufacturer of the extrusion press. If required information is not available, standard tests may be performed to obtain the information. For instance, the designer must determine (a) the maximum tonnage of the press or press capacity, (b) the billet diameter, (c) the container length, (d) the maximum ram speed of the press, (e) the overall container size, (f) the operating temperatures and speeds for the press, and (g) the dead cycle time of the press. Other standard characteristics of the press may also be obtained as required by the designer.

The designer then obtains the end-product specifications. For instance, the designer may need to obtain the final product length, the dimensional tolerance of the extruded product, the mechanical properties, and the acceptable surface finish of the product.

All of the above-listed information may be entered into a computer that stores the information and may perform various required calculations.

Figure 11:
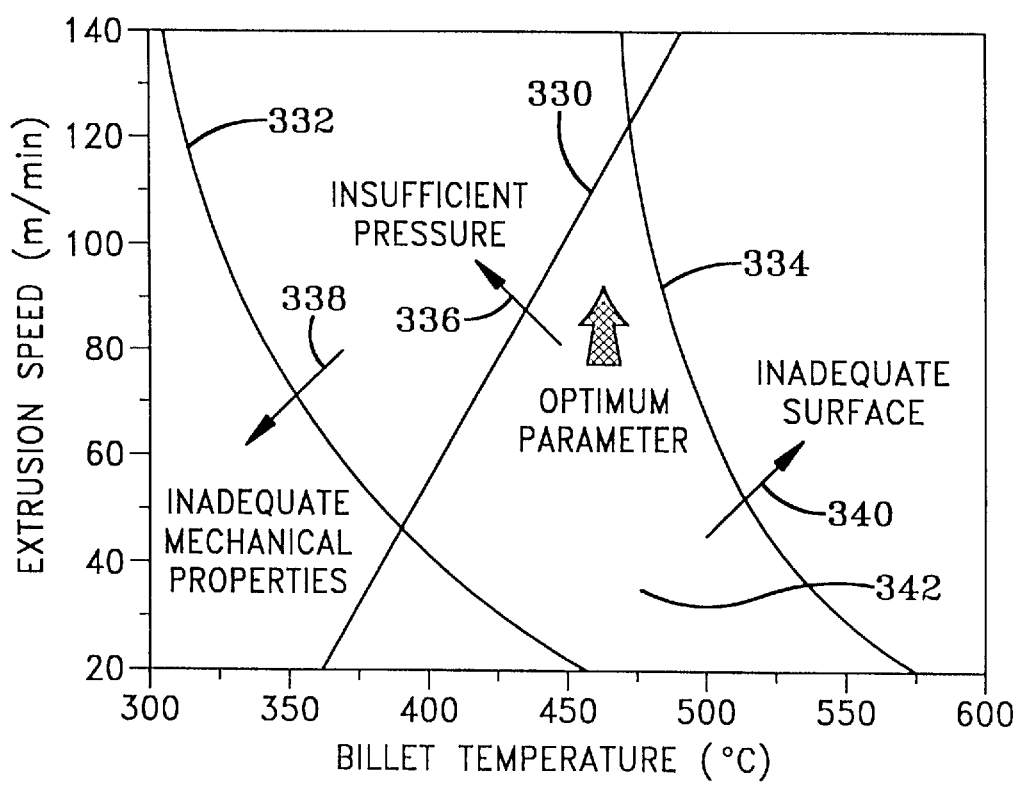
FIG. 11 is an example of an extrusion process limitation chart.

Given the above information, the designer next determines an extrusion process limitation chart for the specific extrusion profile, extrusion press, and the extrusion material. The extrusion process chart graphically describes the relationship of extrusion temperature and extrusion speed. The purpose of the extrusion process chart is to define the preferred extrusion process window having the parameters that will result in acceptable products with no defects and correct mechanical properties while extruding at a high speed to increase productivity. An example of an extrusion process chart is depicted in FIG. 11. The chart has the billet temperature along the x axis and the extrusion speed along the y axis. The chart includes three main limitation lines. The first is the extrusion press capacity line 330 The second is the mechanical properties line 332. The third is the maximum extrusion temperature line 334 that shows the maximum extrusion temperature that can be tolerated before incipient melting occurs.

The extrusion press capacity line 330 is determined based on the information gathered in the above-described steps. The line 330 will vary depending on the extrusion profile, the extrusion material, and the extrusion press. As indicated by the arrow identified as numeral 336, any temperature and speed combinations to the left of the line 330 will result in insufficient pressure to correctly form the extruded product. The line is defined by the following formula:

$$P=\sigma*\{A*[\alpha*\ln[A/(N*Af)]+(\frac{2}{3}^{0.5})*[(\alpha/(\sin(\alpha))-\cot(\alpha)]+ [(\frac{1}{3}^{0.5})*\cot(\alpha)*\ln[A/(N*Af)]+(m/3^{0.5})*Lc*L1/Af+ (\frac{2}{3}^{0.5})*\pi*R*(L-(Rb-Re)*\cot(\alpha))\}$$

where:

P is the push or pull stress of the extrusion press;

$\sigma$ is the material flow stress and is a function of the Extrusion temperature, strain, and strain rate;

$\alpha$ is the material flow angle on the die surface;

m is the friction factor of the material;

N is the number of holes in the die;

A is the cross-sectional area of the billet;

Af is the area of the extrusion profile;

L is the length of the billet;

L1 is the length of the die bearing;

Rb is the effective radius of the portion of the billet feeding one hole; and

Re is the effective radius of the extrusion profile.

All of these parameters may be determined from the information previously gathered for the material, extrusion profile, and extrusion press. $\sigma$ is determined by experimenting on the material or by obtaining the value from standard tables. It may thus be understood that this formula may be used to create line 330 on the extrusion process chart.

The mechanical properties line 332 can also be found through experiment and defines the limit where the materials are dissolved into second phase particles. Any temperature and speed combinations to the left of line 332 result in inadequate mechanical properties are indicated by arrow 338.

The maximum extrusion temperature line 334 defines the surface finish (imitation as may be seen in FIG. 11. When the extrusion occurs at a temperature and speed to the right, indicated by arrow 340, of line 334, the extruded product has an unacceptable surface finish. This line may be determined by standard experiments known to those skilled in the art. The limit is largely dependent on the solidus temperature of the second phase particle of the extrusion material. The maximum temperature is a function of the solidus temperature, the extrusion time, the extrusion temperature, and the extrusion pressure. In one embodiment of the present invention, a computer subroutine calculates the maximum extrusion temperature using a finite difference and statistical model.

Once the three limitation lines are defined on the extrusion process limitation chart, a preferred processing window, indicated generally by the numeral 342 is defined between the lines 330, 332, and 334. Running the extrusion process within this window 342 results in acceptable mechanical properties, no product defects, and a high productivity rate.

After the extrusion process chart has been defined, the designer conducts simulations of the extrusion process on a computer to determine what will happen to the temperatures and pressures during the extrusion process. The simulation allows the designer to track the progress of the process on the extrusion process chart and determine the optimal extrusion process parameters.

Based on the input data, for instance a specific temperature and speed, the simulation predicts the result of the extrusion process and informs the designer where the process falls on the extrusion process chart. For instance, when an extrusion process is started at a selected temperature and speed, the simulation continuously updates the temperature and speed as the process proceeds. If the process results in temperatures and speeds that fall outside the window 342, the designer must change the input accordingly. When the simulation tells the designer that all data points are within the window 342, the optimal process parameters may be found. The optimal parameters are the speed and temperature that allows the process to be run entirely within window 342 at the fastest speed. The fastest speed is important to improve productivity. From this information, the simulation may also yield the extrusion exit temperature, the extrusion speed, the strain rate, the extrusion pressure, the extrusion cost, the productivity, and the profit.

The next step of the process is to use the optimal process parameters discovered above to design an extrusion die configured specifically for the extrusion process. This step results in an extremely efficient and effective extrusion die because the extrusion profile to be cut in the die was used to define the optimal process parameters above. As such, the designer already knows the extrusion temperature and speed. Armed with this knowledge, the designer may calculate the thermal expansion of the extruded product and the amount of die deflection that will occur during extrusion. Once these amounts are known, the designer may modify the die design to accommodate for these effects.

The designer first determines the thermal shrinkage that will result in the extruded product after it has been extruded. Knowing how much the product will shrink as it cools allows the die designer to increase the size of the extrusion profile to accommodate for the future shrinkage. The following formula is used to modify the extrusion profile:

$$OA'/OA = OB'/OB = (1+c*(12.19*Te+3.115*10^{-3}*Te^2)*10^{-6})/(1+c*(12.19*Ta+3.115*10^{-3}*Ta^2)*10^{-6})$$

where:

c is the coefficient of thermal expansion of the extrusion material;

Te is the temperature during extrusion; and

Ta is room temperature.

Figure 12:
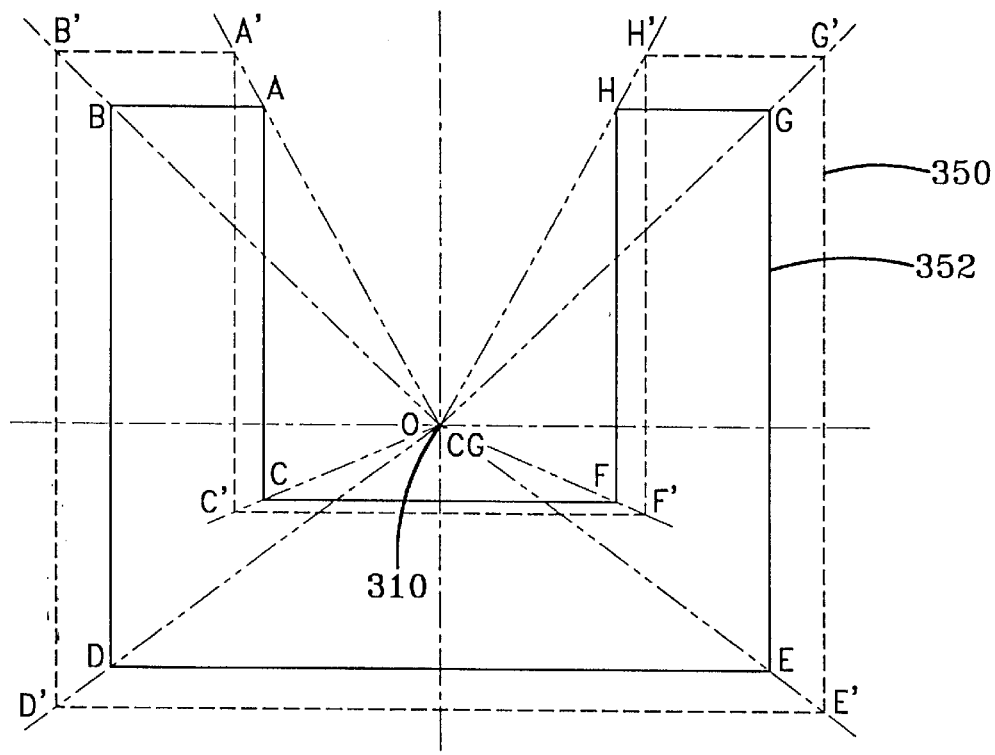
FIG. 12 is a schematic representation of the effects of thermal shrinkage on an extruded product.
Figure 13:
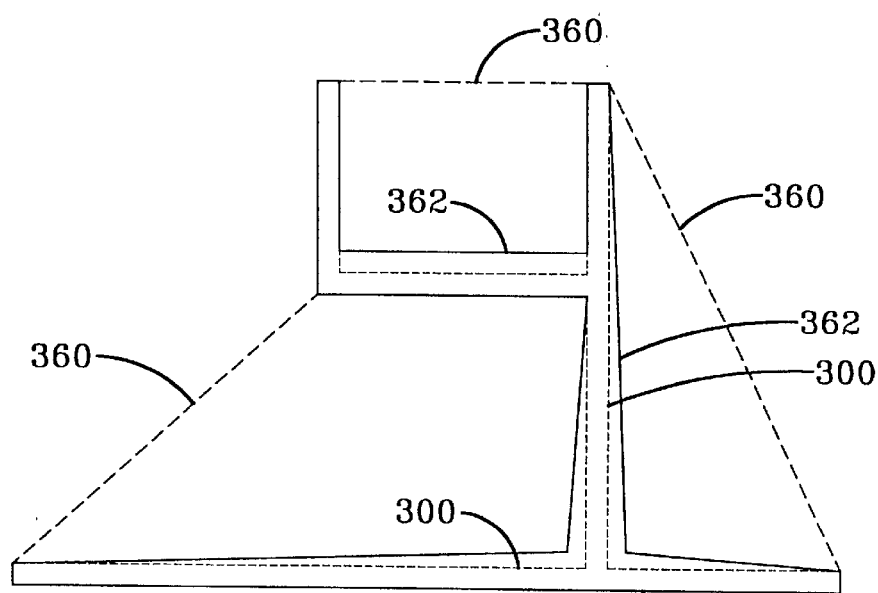
FIG. 13 is a schematic representation of the effects of die deflection on an extrusion die.

The result of this calculation may be seen in FIG. 12 wherein line 350 represents the expanded condition of the extrusion profile and line 352 represents the cooled size of the extrusion profile. Although this correction is typically very slight, it does result in a better quality product and fewer product defects based on dimensions.

Next, the designer modifies the extrusion profile for die deflection. When a die is subjected to the high temperatures and pressures of an extrusion process, the die walls bend in the direction of extrusion. As a result of this bending, the extrusion profile changes. The method of the present invention designs a die that accommodates this bending so that it will not negatively effect the extruded product. In one embodiment of the present invention, the die designer is presented with the extrusion profile 300 on a computer screen. The designer next chooses the base lines 360 about which the profile 300 will bend during the extrusion process. The computer then calculates the amount of deflection that will occur during the extrusion process. The deflection calculations are known in the art. The amount of deflection allows the designer to calculate an extrusion profile to be cut, indicated by the numeral 362, into the die that will bend into the desired profile 300.

Next, the designer performs the method discussed in the first section of this application regarding the bearing and the pocket. The purposes of the bearing and pocket are fully discussed above.

These calculations result in an extrusion die that has been specifically designed for an optimal process for a specific extrusion profile. Thus, when the die is used in the extrusion press from which data was inputted in the first step of this method, and the press is operated at the conditions specified above, the resulting product will have excellent surface finish and dimensions. The design of the die based on the optimal parameters also results in essentially no trial and error runs to set up the extrusion process.

After the parameters of the die are calculated, the die designer physically manufactures the die using computer-controlled manufacturing equipment. In one embodiment of the present invention, the extrusion profile and die design parameters are held in a computer program that is capable of communicating with an Electrical Discharge Machine (EDM) and Computer Numerical Control Machine (CNC). These machines may be driven directly from the computer program to cut a die in a blank.

The tools can be driven to form a conventional undercut die or a no-undercut design. When a no-undercut design is used, the EDM makes a first pass at a ninety degree angle to form the profile. The EDM then makes a second pass at an angle to form the bearing. The angle may be chosen by the operator and the distance from the die opening may be calculated from the formula: Distance from die opening= Bearing size tangent (tool angle). The EDM then follows this new path to cut the continuous bearing. The CNC machine follows the instructions from the computer and cuts away the pocket.

The advantages of this manufacturing method include: (a) a continuous bearing totally eliminates the die line on the extrusion surface; (b) the die is much stronger without an undercut; (c) a smaller die bearing increases extrusion speed and surface finish; and (d) human error is eliminated by allowing the computer to control the manufacturing machines.

Figure 14:
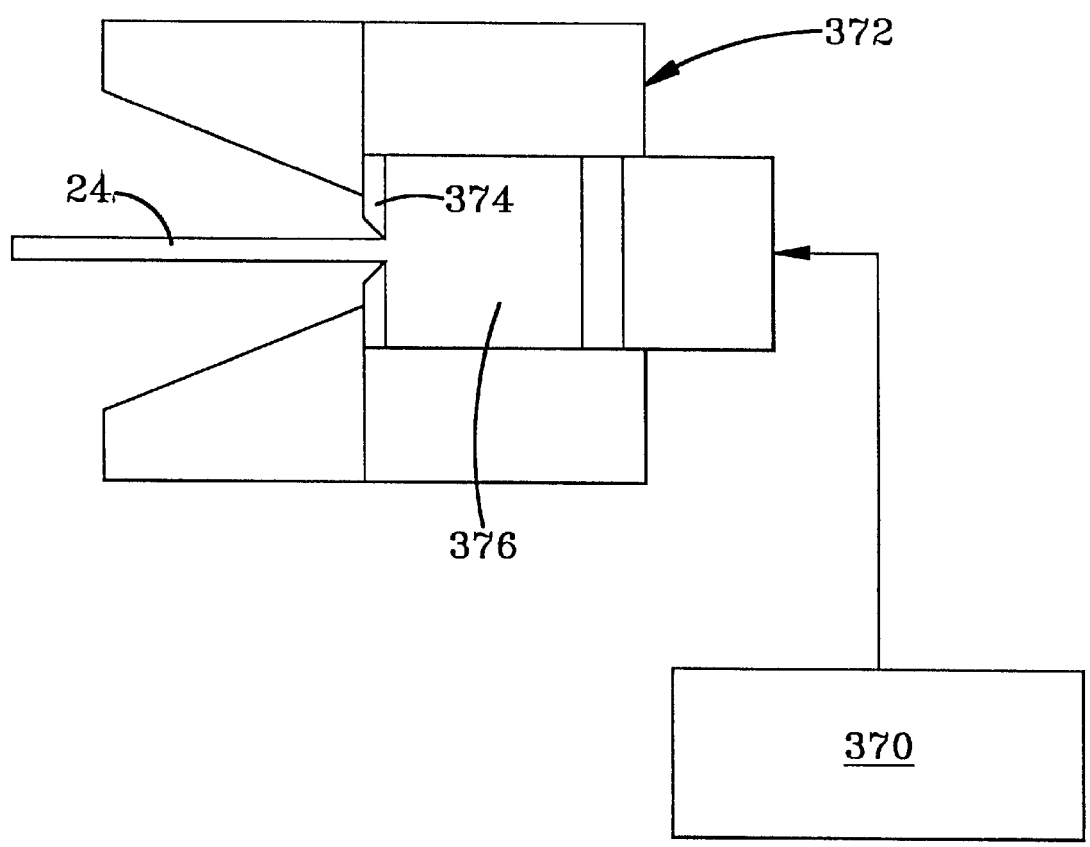
FIG. 14 is a schematic diagram of a feed forward extrusion process.

The last step of the process of the present invention involves running the extrusion processor from the computer that created the optimal extrusion parameters. This type of system may be referred to as a feed-forward system because the steps of trial and error have been substantially eliminated. A schematic of this system is depicted in FIG. 14. A computer 370 feeds the optimal extrusion parameters to the extrusion press 372. The die 374 that has been specifically designed for the process is placed in the press 372. The extrusion material 376 that was used to obtain the optimal parameters is also used. When the process is started up, the optimal parameters guarantee that the extrusion process will follow the best extrusion process for the extrusion die and profile.

Figure 15:
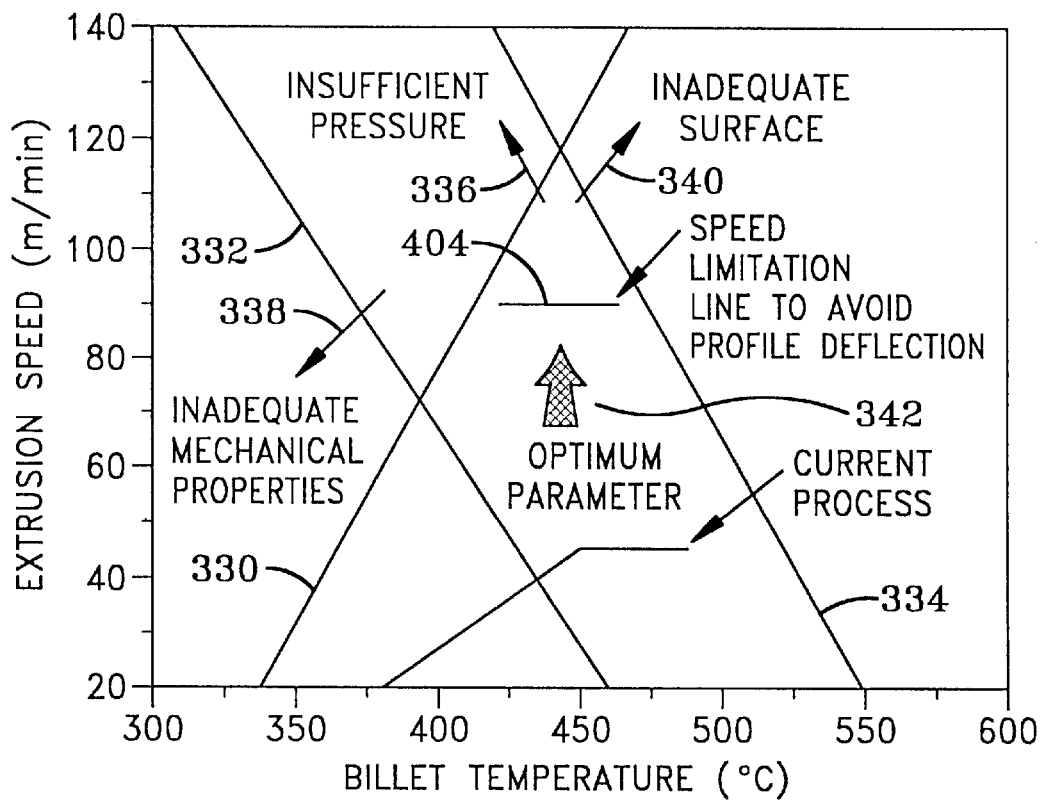
FIG. 15 is an example of an extrusion process limitation chart according to an alternative method of the present invention.

An alternative method of designing the extrusion process will now be described with reference to FIGS. 15 and 16. In the aluminum extrusion process, the extrusion temperature and speed must be controlled carefully in order to avoid defects such as surface finish defects, inadequate mechanical properties defects, and profile deflection defects. The above-described method explains how the mechanical properties defects and surface finish defects are avoided. In the alternative method described below, the steps to avoid excessive profile deflection and the resulting loose dimensional tolerance will be described. The alternative methodology described in the following sections define a "speed limitation line" on the extrusion process chart. When combined with the extrusion process chart described above, this "speed limitation line" may be programmed into the computer to simulate different types of extrusion profiles, material properties, and extrusion facilities to further determine the optimal extrusion process parameters such as optimal extrusion temperature and extrusion speed.

In the method described above, the computer calculates the extrusion process and generates the speed of the material flow from the die opening. By performing another calculation, the speed (V) of the material flow from any section, or any position of the die may be determined. The speed of the material flow will vary due to different locations of the profile on the die and different wall thicknesses of the profile. An exemplary profile is depicted in FIG. 16 and is indicated generally by the numeral 400. The material flowing through die 402 having profile 400 has different velocities at different points along profile 400. For instance, the speed of the material is different at point "A" than the speed of the material at point "B."

The maximum strain rate ($\epsilon$) of the material flow at any position of profile 400 may be determined by the following formula: $\epsilon \approx 2*V/d$; where "V" is the material exit speed at a particular position of the profile on the die; and "d" is the equivalent diameter at the subject position. The determination of d is known in the art. One method for determining d is to measure the cross sectional area of a circumscribed circle at the subject position.

The pressure of the material flow at any position of profile 400 may be determined by the flow stress ($\sigma$) on any particular position. The flow stress ($\sigma$) may be determined by the following formula: $\sigma = C* \epsilon m$; where "C" is the strength coefficient; "$\epsilon$" is the strain rate; and "m" is the strain rate sensitivity. The determination of these numbers is known in the art.

Profile 400 will begin to deflect when the pressure at one point differs from the pressure at another point. Such deflection will change the dimensions of the product being produced by the extrusion process through die 402. If the dimensional tolerance specified by the designer is exceeded by the deflection, the maximum allowable pressure of the extrusion process will be limited. During the extrusion process, a higher extrusion speed will cause a higher exit material speed variation from the die due to the friction of the container and bearing. From the steps described above, we know that if the speed in any particular position is much higher, then the strain rate will be high causing a higher pressure and excessive deflection. The maximum allowable difference pressure caused the profile deflection thus can be governed by the maximum extrusion exit speed. Combined with the extrusion process simulation methodology, the above steps may be defined in the computer program to determine the maximum allowable extrusion speed to avoid excessive profile deflection. Once the maximum allowable extrusion speed is determined, a "speed limitation line" 404 is defined in the extrusion process chart as indicated in FIG. 15. The extrusion process speed must be kept below line 404 to prevent the undesired deflection. Window 342 is thus limited by a fourth line in addition to the three lines 330, 332, and 334 described above.

Figure 16:
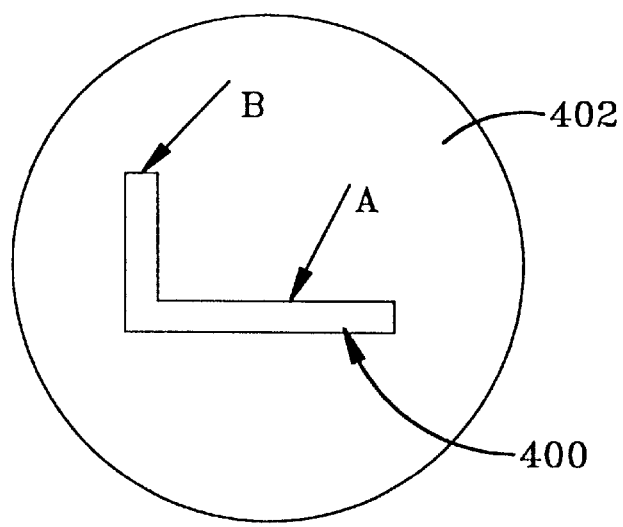
FIG. 16 is a front elevational view of a die showing an exemplary profile to illustrate speed variation based on different locations at the profile.

For example, the material flow speed at points A and B of FIG. 16 will be different. If the material flow is slow with low extrusion ram speed, then the speed variation between points A and B will be minimal. If the extrusion ram speed increases, the speed difference at points A and B will become higher due to container friction and the location of profile 400. The speed variation will cause the material to deflect. Through the use of the computer simulation and the steps described above, the maximum extrusion ram speed is determined to avoid any profile deflection exceeding dimension tolerance specified by the designer.

While only preferred embodiments of my present invention are disclosed, it is to be clearly understood that the same are susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a process for designing an extrusion process results in an efficient, productive, and profitable extrusion process, but also that the other objects of the invention can be likewise accomplished.

We claim:

1. A method for designing an extrusion process, comprising the steps of:

selecting an extrusion profile, an extrusion material, and an extrusion processor;

determining an extrusion press capacity line for the selected extrusion profile, extrusion material, and extrusion processor, the extrusion press capacity line defining the minimum temperature and a maximum speed required for the selected extrusion profile, extrusion material, and extrusion processor;

determining a mechanical properties line for the selected extrusion profile, extrusion material, and extrusion processor, the mechanical properties line defining the minimum temperature and minimum speed required to maintain the selected extrusion material in a physical state where in can be properly extruded;

determining the maximum extrusion temperature line for the selected extrusion profile, extrusion material, and extrusion processor, the maximum extrusion temperature line defining the maximum temperature and maximum speed that results in a proper surface finish;

selecting a temperature greater than the minimum temperature defined by the extrusion press capacity line and the mechanical properties line and less than the maximum temperature defined by the maximum extrusion temperature line;

determining a speed limitation line for the selected extrusion profile, extrusion material, and extrusion processor; the speed limitation line defining the maximum speed that may be used before profile deflection occurs;

selecting a speed greater than the minimum speed defined by the mechanical properties line and less than the maximum speed defined by the extrusion press capacity line, the maximum extrusion temperature line, and the maximum speed limitation line; and designing an extrusion die based on the selected temperature and speed.

2. The method of claim 1, further comprising the step of calculating the speed limitation line from the strain rate of the material flow.

3. The method of claim 2, further comprising the step of basing the strain rate on the material exit speed of the material from the selected extrusion profile.

4. The method of claim 3, further comprising the step of measuring the speed at different points along the selected extrusion profile.

5. The method of claim 1, further comprising the step of running a simulation based on the selected temperature and speed to determine if any of the limitation lines are crossed during the operation of the process.

6. The method of claim 5, further comprising the step of changing the selections of temperature and speed and running the simulation again to determine if any of the limitation lines are crossed during the operation of the process.

7. The method of claim 6, further comprising the step of repeating the selection and simulating steps.

8. The method of claim 1, further comprising the steps of determining the configuration of a pocket surrounding the selected extrusion profile; establishing a pocket angle between the pocket and the selected extrusion profile; and varying the pocket angle of the pocket based on the selected extrusion profile.

9. The method of claim 8, wherein the step of designing the die includes the step of altering the selected extrusion profile to account for thermal shrinkage based on the selected temperature and speed.

10. The method of claim 9, wherein the step of designing the die further includes the step of altering the selected extrusion profile to account for die deflection based on the selected temperature and speed.

11. The method of claim 1, further comprising the step of charting the extrusion press capacity line, the mechanical properties line, and the maximum extrusion temperature line on a common graph to show a window of acceptable temperatures and speeds that should be selected.

12. The method of 11, further comprising the step of using a computer to determine the extrusion press capacity line, the mechanical properties line, and the maximum extrusion temperature line.

13. The method of claim 11, further comprising the step of charting the speed limitation line on the common graph.

14. The method of claim 13, further comprising the step of using a computer to determine the speed limitation line.

* * * * *